United States Patent
Hunter et al.

(10) Patent No.: US 6,665,699 B1
(45) Date of Patent: Dec. 16, 2003

(54) METHOD AND DATA PROCESSING SYSTEM PROVIDING PROCESSOR AFFINITY DISPATCHING

(75) Inventors: Jesse D. Hunter, Glendale, AZ (US); Michel Brown, Glendale, AZ (US); David A. Egolf, Glendale, AZ (US); Jon Keil, Phoenix, AZ (US); Michael Meduna, Phoenix, AZ (US)

(73) Assignee: Bull HN Information Systems Inc., Billerica, MA (US)

( * ) Notice: Subject to any disclaimer, the term of this patent is extended or adjusted under 35 U.S.C. 154(b) by 0 days.

(21) Appl. No.: 09/404,287

(22) Filed: Sep. 23, 1999

(51) Int. Cl.[7] ............................. G06F 17/00; G06F 9/00
(52) U.S. Cl. ..................... 709/102; 709/100; 709/103; 709/104; 709/105; 709/106; 709/107
(58) Field of Search .................................. 709/103, 226, 709/104; 710/52; 711/121, 120; 712/23

(56) References Cited

U.S. PATENT DOCUMENTS

| | | | | |
|---|---|---|---|---|
| 4,809,157 A | * | 2/1989 | Eilert et al. .................. | 709/104 |
| 4,992,930 A | * | 2/1991 | Gilfeather et al. .......... | 711/121 |
| 5,185,861 A | * | 2/1993 | Valencia ...................... | 711/120 |
| 5,333,319 A | * | 7/1994 | Silen ........................... | 709/103 |
| 5,745,778 A | * | 4/1998 | Alfieri ........................... | 712/1 |
| 5,826,081 A | * | 10/1998 | Zolnowsky ................. | 709/103 |
| 5,867,725 A | * | 2/1999 | Fung et al. ................... | 712/23 |
| 5,872,972 A | * | 2/1999 | Boland et al. ............... | 709/102 |
| 6,269,390 B1 | * | 7/2001 | Boland ......................... | 709/100 |
| 6,289,369 B1 | * | 9/2001 | Sundaresan .................. | 709/103 |
| 6,505,250 B2 | * | 1/2003 | Freund et al. ............... | 709/226 |

OTHER PUBLICATIONS

John Enck. "Windows & .net Magazine: How Windows NT Dispatches Processes and Threads" Oct. 1998. Windows & .net Magazine. p 1–2.*
"IBM Technical Disclosure Bulletin: Dispatcher Queue to Provide Processor Affinity in a Multiprocessor." Feb. 1994. IBM. vol. 37 No. 2A p. 573–576.*
IBM TDB vol. 37 No. 02A "Dispatcher Queue to Provide Processor Affinity in a Multiprocessor" Feb. 1994.*

* cited by examiner

Primary Examiner—Ayaz R. Sheikh
Assistant Examiner—Christian La Forgia
(74) Attorney, Agent, or Firm—Bruce G. Hayden; Faith F. Driscoll (57) ABSTRACT

A processor in a data processing system having multiple cache memories performs cache memory or processor module affinity dispatchin. Processes awaiting dispatch are stored in prioritized queues. Each queue has a priority chain, and a chain for each cache memory or processor module, with each chain containing processes ready for dispatch. The dispatcher checks the queues in priority order, starting with the priority chain for a queue, followed by the chain corresponding to the cache memory or processor module that the process last executed upon, followed by chains corresponding to other cache memories or processor modules.

20 Claims, 4 Drawing Sheets

METHOD AND DATA PROCESSING SYSTEM PROVIDING PROCESSOR AFFINITY DISPATCHING

FIELD OF THE INVENTION

The present invention generally relates to data processing systems, and more specifically to providing processor affinity dispatching.

BACKGROUND OF THE INVENTION

A data processing system with multiple processors provides added complexities over single processor systems. These complexities are compounded when multiple processors are grouped into processor modules containing cache memories shared among the processors in a processor module.

One of the functions provided by modem operating systems is termed multiprogramming. This means that a processor is concurrently virtually executing more than one job or process at a time. This is typically done by time slicing, where one process gets control of the processor and executes for awhile. Than another process gets control and executes for awhile.

One technique that has become common in modern computer architectures is the usage of cache memories. Cache memories are much higher speed and much smaller memories than the computer's main memory. They provide processor efficiency benefits since computer programs tend to have locality in their references to memory. This means that after a certain memory location is referenced, it is more likely that memory locations close to the referenced memory location are next referenced, compared to the remaining locations in memory. The earlier memory reference will bring a chunk of data or instructions stored in main memory into the higher speed cache memory, assuming that locations in the chunk will be referenced shortly.

Cache memory works well as long as one process has control of a processor. However, in a multi-programming operating system, the process in control of the processor will ultimately be suspended and another process dispatched on that processor. At that time, the newly dispatched process has a completely different locality. Most of its data and instructions will not be found in the cache memory, but rather in main memory.

In a data processing system with multiple processors, the processors can be organized into processor modules, with each processor module having a cache memory shared among the processors in a processor module. These processor module cache memories are typically much larger than the cache memories on-board in each of the processors. However, even though these cache memories are quite a bit larger, their utilization in a multi-programming system cause some of the same problems encountered in switching between different processes to execute. In particular, when a process is finally redispatched, it will often find portions of its data and/or instructions to be located in a processor module cache memory other than the one shared by the processor executing the process. The result is that these portions of data and instructions will have to be reloaded from main memory, or siphoned from the cache memory containing them. In either case, processor efficiency is degraded. It would be advantageous if this processor inefficiency could be reduced, resulting in increased system throughput.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION

A processor in a data processing system having multiple cache memories performs cache memory or processor module affinity dispatching. Processes awaiting dispatch are stored in prioritized queues. Each queue has a Priority chain, and a chain for each cache memory or processor module, with each chain containing processes ready for dispatch. The dispatcher checks the queues in priority order, starting with the Priority chain for a queue, followed by the chain corresponding to the cache memory or processor module that the process last executed upon, followed by chains corresponding to other cache memories or processor modules.

A dispatcher providing cache memory or processor module affinity, as described below, is able to maximize cache memory hit rates across process dispatches. This in turn reduces overall program execution times, and increases effective processor efficiency because more data and instructions are able to reused from cache memory, instead of having to reload them from slower main memory.

In the following description, numerous specific details are set forth such as specific word or byte lengths, etc. to provide a thorough understanding of the present invention. However, it will be obvious to those skilled in the art that the present invention may be practiced without such specific details. In other instances, circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

The term "bus" will be used to refer to a plurality of signals or conductors which may be used to transfer one or more various types of information, such as data, addresses, control, or status.

Figure 1:
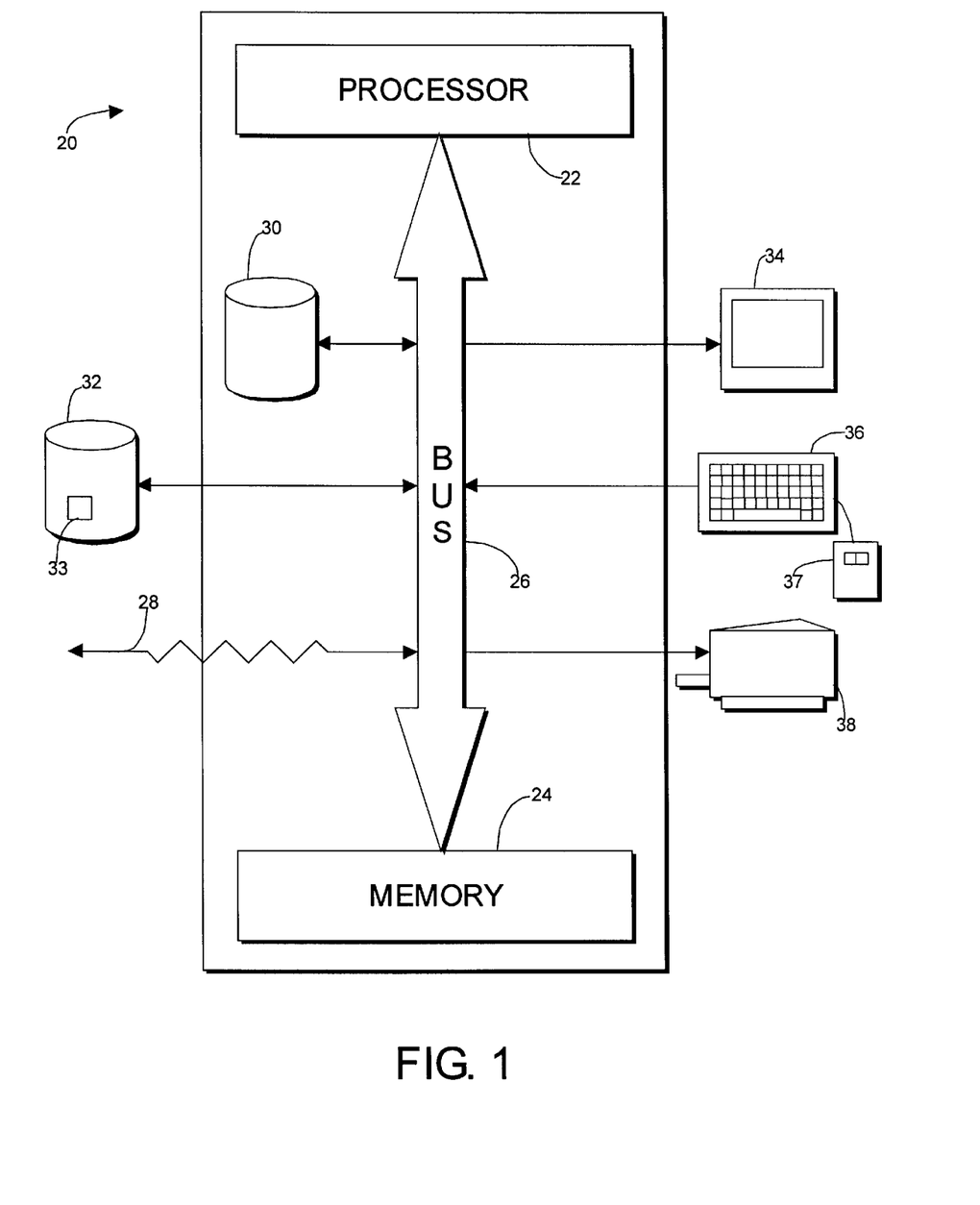
FIG. 1 is a block diagram illustrating a General Purpose Computer, in accordance with the present invention.

FIG. 1 is a block diagram illustrating a General Purpose Computer 20. The General Purpose Computer 20 has a Computer Processor 22, and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 (with mouse 37), and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such as test programs, operating systems, and user programs can be stored in a Computer Software Storage Medium, such as memory 24, Secondary Storage 30, and External Storage 32. Executable versions of computer software 33, can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

Figure 2:
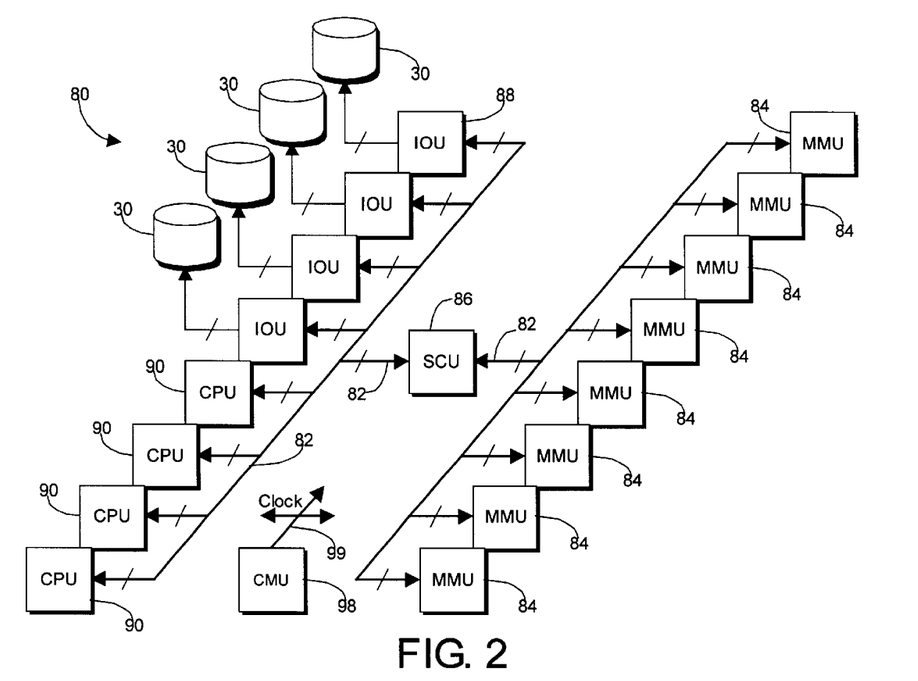
FIG. 2 is a block diagram of a more detailed view of a multiprocessor data processing system, in accordance with the present invention.

FIG. 2 is a block diagram of a more detailed view of a multiprocessor data processing system, in accordance with the present invention. The multiprocessor data processing system 80 comprises a plurality of modules coupled together via an intramodule bus 82 controlled by a storage control unit 86. In the preferred embodiment, each such module 84, 88, 90 is contained on a single board, with the boards connecting into a backplane. The backplane includes the intramodule bus 82. In the representative data processing system 80 shown in FIG. 2, sixteen modules are shown. The system includes four (4) processor ("CPU") modules 90, four (4) Input/Output ("IOU") modules 88, and eight (8) memory ("MMU") modules 84. Each of the four Input/Output ("IOU") modules 88 is shown coupled to secondary storage 30. This is representative of the function of such IOU modules 88. Each IOU module 88 will typically contain a plurality of IOU processors (not shown). Each of the eight memory modules 84 contains memory 24 and a memory controller (not shown). This memory 24 (see FIG. 1) is typically Dynamic Random Access Memory (DRAM). Large quantities of such memory 24 are typically supported. Also shown in FIG. 2 is a Clock Management Unit 98, which supplies a standard clock signal 99 to the remainder of the system 80. As clock signals are ubiquitous in digital computer architectures, the clock signal 99 will not be shown further herein except where relevant. Note also that in the preferred embodiment, multiple Clock Management Units 98 are utilized to provide a redundant clock signal 99.

Figure 3:
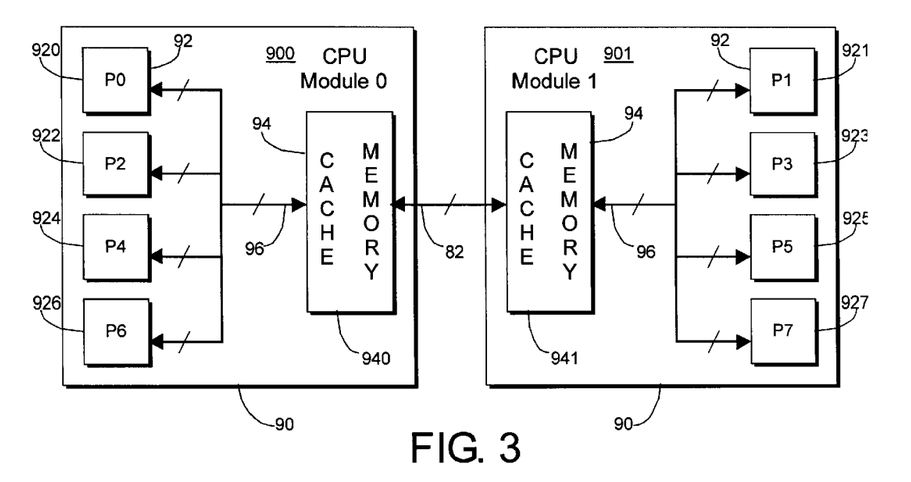
FIG. 3 is a block diagram illustrating a pair of processor (CPU) modules as shown in FIG. 2.

FIG. 3 is a block diagram illustrating a pair of processor (CPU) modules 90 as shown in FIG. 2. The two CPU modules 90 are coupled together and communicate over the intramodule bus 82. The CPU modules 90 each contain a plurality of processors (CPU) 92 and a Level 2 (L2) cache memory system 94 shared among the processors 92. In the preferred embodiment, each processor (CPU) module 90 contains up to four (4) processors (CPU) 92. The processors 92 and their L2 cache memory system 94 are coupled together and communicate over an intraprocessor bus 96.

The Level 2 (L2) cache memory system 94 is shared among the processors 92 in a CPU module 90. The L2 cache memory system 94 maintains cache copies of data loaded into those processors 92. The cache memory system 94 is considered here a Level 2 cache and is coupled to and communicates with the storage control system (SCU) 88 over the intramodule bus 82 in order to maintain cache coherency between Level 2 (L2) cache memories 94 in each of the processor (CPU) modules 90, as well as between Level 1 (L1) cache memories in each of the processors 92, and on the IOU modules 88. The SCU 88 also maintains coherency between the various cache memories 94, and the typically slower speed memory in the MMU modules 84. In the preferred embodiment, a single block of memory or cache line will be owned for update by a single cache or memory at potentially each level in the memory hierarchy. Thus, a given memory block or cache line may be owned by one Level 1 (L1) cache, by one Level 2 (L2) cache 94, and by one MMU 84. However note that that a cache line can be held for read by multiple caches in the hierarchy.

In the preferred embodiment, two GCOS 8 CPU modules 90 are supported: CPU module M0 900, and CPU Module M1 901. Each of these two CPU modules 900, 901, has an L2 cache memory 94 and four processors or CPUs 92. CPU Module M0 900 contains L2 Cache Memory C0 940 and processors: P0 920, P2 922, P4 924, and P6 926. CPU Module M1 901 contains L2 Cache Memory C1 941 and processors: P1 921, P3 923, P5 925, and P7 927. Note that in this embodiment, identification of which CPU module 90 and L2 cache memory 94 correspond to any processor 92 can be efficiently determined by isolating the low-order processor 92 number bit. Thus, all even-numbered processors (P0 920, P2 922, P4 924, and P6 926) correspond to CPU Module M0 900 and L2 Cache Memory C0 940, while all odd-numbered processors (P1 921, P3 923, P5 925, and P7 927) correspond to CPU Module M1 901 and L2 Cache Memory C1 941.

Figure 4:
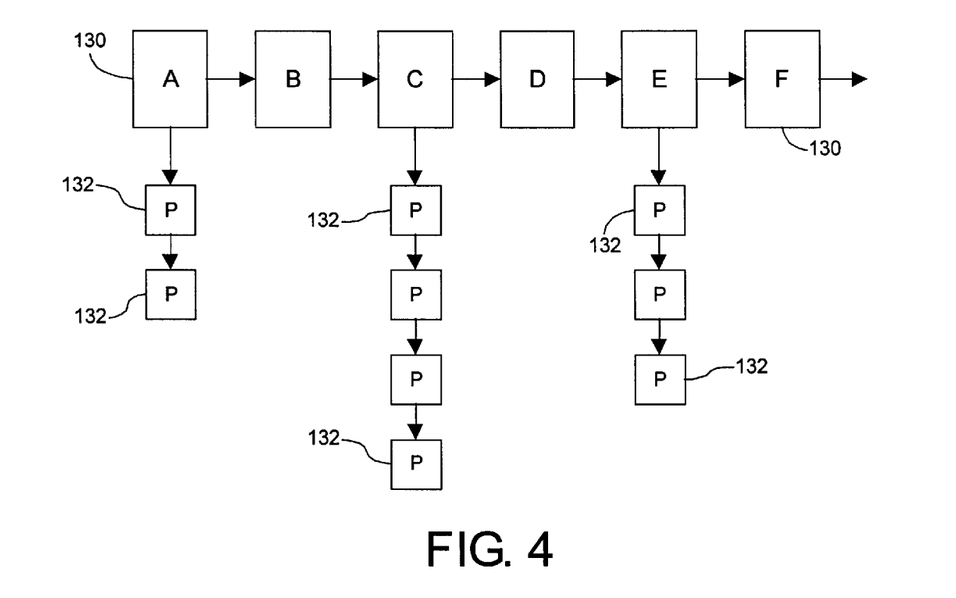
FIG. 4 is a block diagram illustrating dispatch queues, in a prior art embodiment of the present invention.

FIG. 4 is a block diagram illustrating dispatch queues, in a prior art embodiment utilized by the present invention. A plurality of prioritized dispatch queues 130 are supported. Six queues 130 are shown in this FIG. identified as Queues A through F. The preferred embodiment utilizes twelve queues 130, identified as Queues A through L. Other numbers of queues 130 are within the scope of the present invention. Each dispatch queue 130 contains zero or more processes (P) 132 awaiting dispatch.

When a process is ready to execute, a dispatch queue entry 132 is placed on one of the dispatch queues 130. Then, when a processor finishes what it is currently doing, it looks in the dispatch queues 130 for the next thing to do. At its simplest, this involves checking the dispatch queues 130 in priority order until some process is found to execute. The selected process entry 132 is then removed from the dispatch queue 130, the processor then switches to the proper environment, and executes the process. It will typically continue executing that process until something happens that causes the process to give up the processor. This later typically happens whenever certain types of interrupts happen, or when the process needs the operating system to perform some function, such as wait for I/O to complete. One such typical interrupt causing a process to be interrupted is an interval timer which is used to implement time slicing.

In the preferred prior art embodiment, the dispatch algorithm is somewhat more complex. As before, the dispatch queues 130 are searched in priority order. However, each dispatch queue has a maximum dispatch value (a dispatch "damper"). The dispatches in each dispatch queue 130 are counted, and when they exceed a maximum (the dispatch damper) for that dispatch queue 130, that dispatch queue 130 is bypassed until all dispatch queues 130 are either being bypassed or are empty, at which time the dispatch counts for each of the dispatch queues 130 are reinitialized. The dispatch damper for the dispatch queues 130 can be dynamically adjusted in response to a changing workload. This dispatching algorithm provides an efficient mechanism for balancing processing among different priority and types of jobs, while providing for priority processing for jobs requiring for example real-time response.

Figure 5:
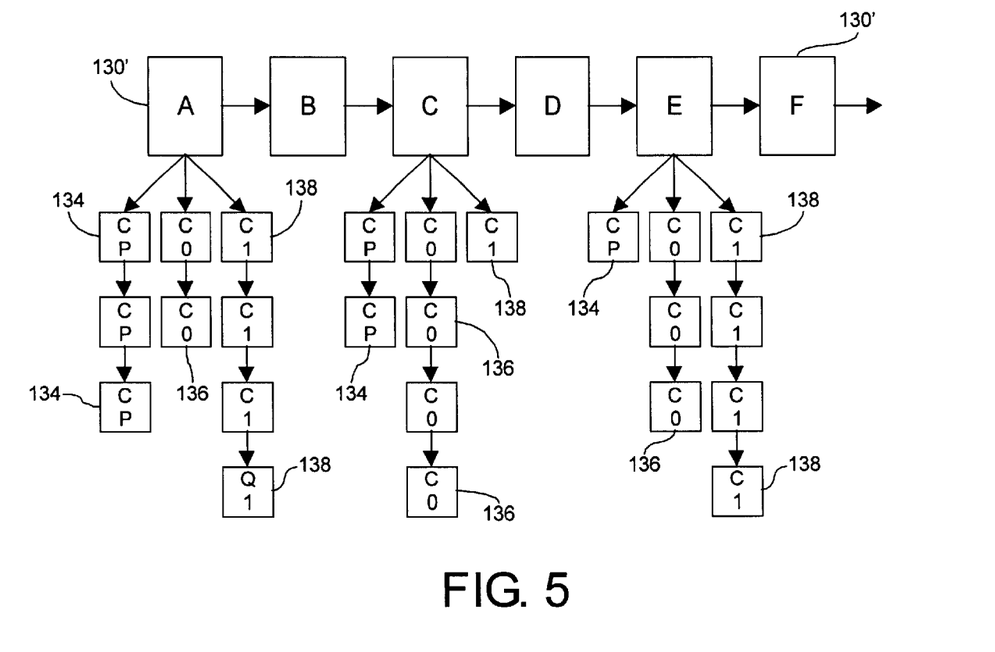
FIG. 5 is a block diagram illustrating dispatch queues, in a preferred embodiment of the present invention.

FIG. 5 is a block diagram illustrating dispatch queues, in a preferred embodiment of the present invention. As with the prior art, a plurality of prioritized dispatch queues 130' are supported. Six dispatch queues 130' are shown in this FIG. identified as Queues A through F. The preferred embodiment utilizes twelve dispatch queues 130', identified as Queues 130' A through L. Other numbers of queues 130' are within the scope of the present invention. Each queue 130' contains three chains of zero or more processes awaiting dispatch. One chain is a Priority chain. It contains priority processes 134 awaiting dispatch. A second chain (the "Even" chain) contains processes 136 awaiting dispatch for CPU module 0 900/L2 Cache Memory C0 940. The third chain (the "Odd" chain) contains processes 138 awaiting dispatch for CPU module 1 901/L2 Cache Memory C1 941.

Each dispatch process queue 130' has an "Even" and an "Odd" chain. These Even and Odd chains are in turn either "Primary" or "Secondary" chains, depending on the number of the processor accessing the queue. In the case of "Even" numbered processors (P0 920, P2 922, P4 924, and P6 926), the "Primary" chain is the "Even" chain 136, and the "Secondary" chain is the "Odd" chain 138. Similarly, in the case of "Odd" numbered processors (P1 921, P3 923, P5 925, and P7 927), the "Primary" chain is the "Odd" chain 134, and the "Secondary" chain is the "Even" chain 136.

In the preferred embodiment, processes start on the Priority chain 134 for the appropriate queue 130'. Then, after the process executes and is requeued for dispatch, it is chained on one of the two other chains 136, 138, depending on which CPU Module 90/L2 cache 94 it was executing upon. A processor 92 when it is looking for the next process to dispatch from a given queue 130', will first check the Priority chain 134. If the Priority chain 134 is empty, the processor then checks for a process to execute on the Primary chain corresponding to the CPU Module 90/L2 cache 94 in which that processor resides. Only when both the Priority chain, and the Primary chain for a processor 92 are both empty is the third ("Secondary") chain searched for a process to dispatch and execute.

Thus, the dispatch algorithm in the preferred embodiment elevates queue priority over processor affinity when determining the next process to dispatch. However, other algorithms are also within the scope of this invention. For example, in one alternative embodiment, the Secondary chain for any given queue 130' is only searched when the Priority and Primary chains for all of the dispatch queues 130' are empty. Another alternate embodiment is somewhere in-between the previous two algorithms. In this embodiment, the Secondary chain checked for dispatchable processes lags the queue for the Priority and Primary chains for a given queue 130'. Thus, if the lag factor is two (2), then the Secondary chain for the A queue 130' is checked after the Priority and Primary chains for the C queue 130'. Similarly, the Secondary chain for the D queue 130' is checked after the Priority and Primary chains for the F queue 130' is checked. Other combinations are also within the scope of this invention.

At the end of a specified time interval (3 seconds in the preferred embodiment), all of the processes from the Primary and Secondary chains are moved to the Priority chain for each queue 130'. This provides a mechanism for rebalancing processor 92, CPU module 90, and L2 cache 94 utilization.

Figure 6:
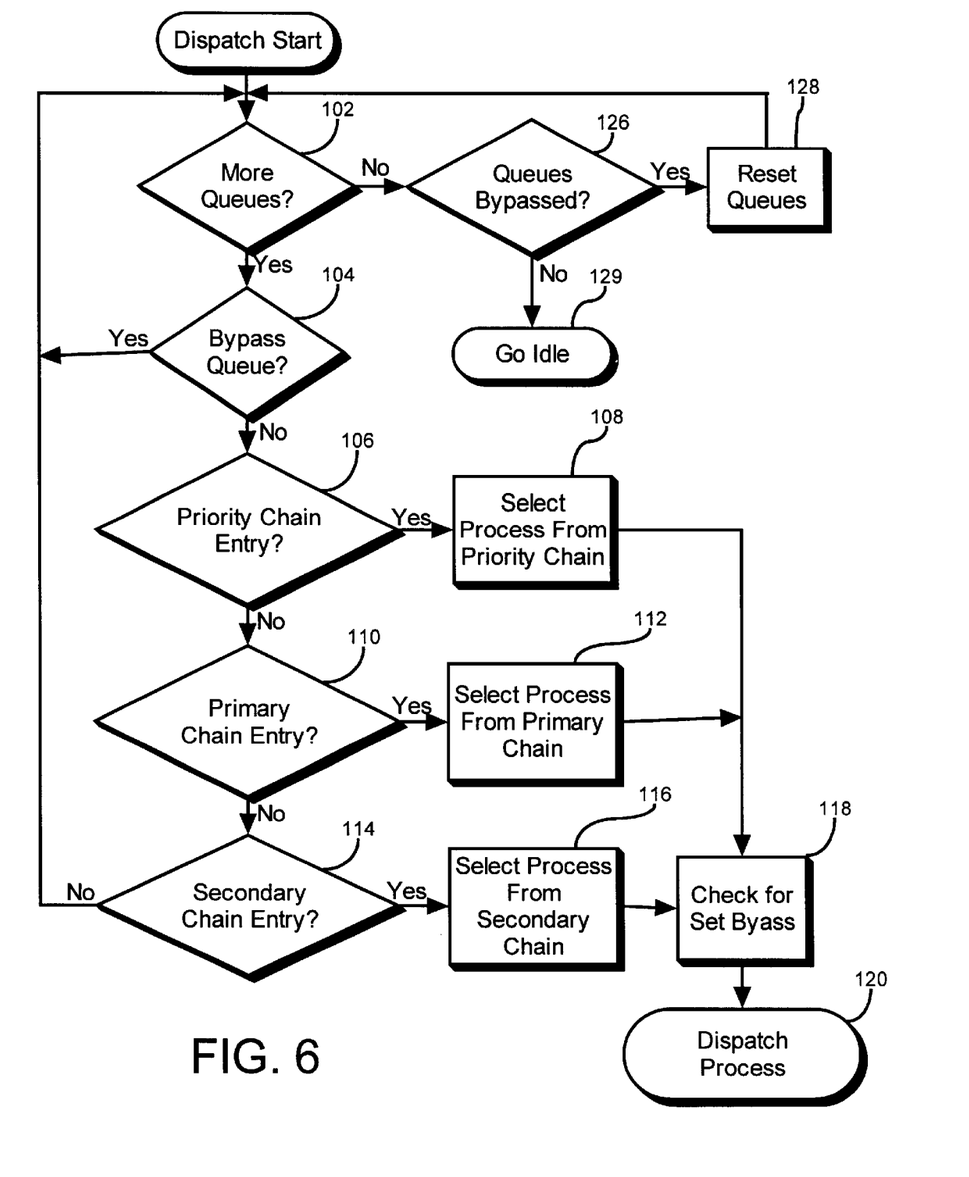
FIG. 6 is a flowchart illustrating processor affinity dispatching, in accordance with a preferred embodiment of the present invention.

FIG. 6 is a flowchart illustrating processor affinity dispatching, in accordance with a preferred embodiment of the present invention. The dispatcher is entered when a processor 92 is looking for work to do. It starts by entering a loop. At the top of the loop, there is a test for more queues 130' to check, step 102. If there is another queue 130' to check, step 102, it is tested to see if it is in bypass mode, step 104. If the queue 130' is in bypass mode, step 104, the loop repeats, starting with the test for more queues, step 102. Otherwise, if the queue 130' is not being bypassed, step 104, a test is made for a process entry in the Priority chain for that queue 130', step 106. If there is an process entry in the Priority chain 134, step 106, it is selected for execution and removed from the Priority chain 134, step 108. Otherwise, a test is made for a process entry in the Primary chain for that queue 130', step 110. If there is an process entry in the Primary chain, step 110, it is selected for execution and removed from the Primary chain, step 112. Otherwise, a test is made for a process entry in the Secondary chain for that queue, step 114. If there is a process entry in the Secondary chain, step 114, it is selected for execution and removed from the Secondary chain, step 116. In all these cases where a process entry 134, 136, 138 is removed from a queue chain 108, 112, 116, the current dispatch count for the queue 130' is incremented and tested against a configured limit. If the current dispatch count for the queue 130' exceeds the configured limit for that queue 130', a bypass flag is set for the queue 130', step 118. In the preferred embodiment, this is implemented by loading a negative queue damper value into the dispatch count field for the queue 130', then incrementing the dispatch count field for each dispatch. The bypass flag is set when the value in the dispatch count field becomes positive. In any case, when a process entry 134, 136, 138 is selected from one of the chains 108, 112, 116, the corresponding process is then dispatched, step 120. This typically includes setting up the processor 92 with the selected process' environment. The processor 92 then begins executing the code addressed by its new environment.

In the situation where no more queues 130' remain to be processed, step 102, a test is made whether any queues 130' have been bypassed, step 126. If any of the queues 130' were bypassed, step 126, all of the queues 130' are reset, step 128. This includes reinitializing the dispatch count for each of the queues 130'. The loop is then reentered, starting with the highest priority queue 130'. Otherwise, if none of the queues 130' were bypassed, step 126, the main dispatcher loop is complete, and the processor can enter idle processing, step 129.

The preferred embodiment showed a Priority chain 134, an Even chain 136, and an Odd chain 138 for each dispatch queue 130'. These correspond to the two different processor modules 900, 901 and L2 cache memories 940, 941. An alternate embodiment supports other numbers of processor modules 90 and L2 cache memories 94. For example, in a system supporting four processor modules 90 and L2 cache memories 94, each dispatch queue 130' will typically have a priority chain, and one chain for each of the four processor modules 90 or L2 cache memories 94.

Those skilled in the art will recognize that modifications and variations can be made without departing from the spirit of the invention. Therefore, it is intended that this invention encompasses all such variations and modifications as fall within the scope of the appended claims.

Claim elements and steps herein have been numbered and/or lettered solely as an aid in readability and understanding. As such, the numbering and/or lettering in itself is not intended to and should not be taken to indicate the ordering of elements and/or steps in the claims.

What is claimed is:

1. A method of dispatching a dispatch unit of work ready for execution in an operating system supporting a plurality of processors, wherein:

a dispatcher in the operating system utilizes a set of queues for dispatching units of work queued for execution by the plurality of processors, with each queue of the set of queues having a plurality of chains of dispatch units of work, each dispatch unit of work being scheduled for execution when queued on one of the plurality of chains according to which component was utilized to execute the dispatch unit of work; and a selected queue is one of the set of queues;

said dispatching method comprising:
A) selecting a first chain from the plurality of chains in the selected queue as a primary chain, wherein:
the selecting of the first chain utilizes an identification of a component in a data processing system that will be utilized to execute a queued dispatch unit of work when dispatched;
B) testing the primary chain in the selected queue for the dispatch unit of work to dispatch;
C) selecting that dispatch unit of work from the primary chain in the selected queue as a next unit of work to dispatch if the primary chain in the selected queue contains a dispatch unit of work to dispatch;
D) selecting a second chain from the plurality of chains in the selected queue as a secondary chain if the next unit of work has not been selected, wherein:
the selecting of the second chain utilizes the identification of the component in the data processing system that will be utilized to execute the queued dispatch unit of work when dispatched;
E) testing the secondary chain in the selected queue for the dispatch unit of work to dispatch if the next unit of work has not been selected;
F) selecting that dispatch unit of work from the secondary chain in the selected queue as the next unit of work to dispatch if the secondary chain in the selected queue contains the dispatch unit of work to dispatch; and
G) dispatching the next unit of work to dispatch.

2. The method in claim 1 which further comprises:
H) selecting another one of the set of queues as the selected queue if the next unit of work has not been selected; and
I) repeating steps (A), (B), (C), (D), (E), and (F) if the next unit of work to dispatch has not been selected.

3. The method in claim 1 which further comprises:
H) selecting a third chain from the plurality of chains in the selected queue as a tertiary chain if the next unit of work to dispatch has not been selected, wherein:
the selecting utilizes the identification of the component in the data processing system that will be utilized to execute the queued dispatch unit of work when dispatched;
I) testing the tertiary chain in the selected queue for the dispatch unit of work to dispatch if the next unit of work to dispatch has not been selected; and
J) selecting that dispatch unit of work from the tertiary chain in the selected queue as the next unit of work to dispatch if the tertiary chain in the selected queue contains the unit of work to dispatch.

4. The method in claim 3 which further comprises:
K) selecting another one of the set of queues as the selected queue if the next unit of work to dispatch has not been selected; and
L) repeating steps (A), (B), (C), (D), (E), (F), (H), (I), and (J) if the next unit of work has not been selected.

5. The method in claim 1 which further comprises:
H) testing a priority chain in the selected queue for the dispatch unit of work to dispatch, wherein:
the priority queue is one of the plurality of chains in the selected queue; and
I) selecting that dispatch unit of work from the priority chain in the selected queue as the next unit of work to dispatch if the priority chain in the selected queue contains the dispatch unit of work to dispatch.

6. The method in claim 5 which further comprises:
J) selecting another one of the set of queues as the selected queue if the next unit of work has not been selected; and
K) repeating steps (A), (B), (C), (D), (E), (F), (H), and (I) if the next unit of work has not been selected.

7. The method in claim 1 which further comprises:
H) testing a bypass indicator for the selected queue; and
I) skipping steps (A), (B), (C), (D), (E), and (F) when the bypass indicator tested in step (H) indicates that the selected queue is to be bypassed.

8. The method in claim 7 which further comprises:
J) testing whether to set the bypass indicator to bypass further dispatches for the selected queue when the next unit of work is selected from the selected queue; and
K) setting the bypass indicator to bypass further dispatches for the selected queue when the testing so indicates in step (J).

9. The method in claim 7 which further comprises:
J) setting the bypass indicator to not bypass further dispatches for the selected queue when a next unit of work is not selected from any of the set of queues.

10. The method in claim 1 wherein:
the component in the data processing system utilized for selecting the first or second chain is a processor.

11. The method in claim 1 wherein:
the component in the data processing system utilized for selecting the first or second chain is a processor module containing a plurality of processors.

12. The method in claim 1 wherein:
the component in the data processing system utilized for selecting the first or second chain is a cache memory.

13. Dispatcher software in an operating system stored in a memory in a data processing system for dispatching a dispatch unit of work ready for execution in the operating system supporting a plurality of processors, wherein:

the dispatcher software utilizes a set of queues for dispatching units of work queued for execution by the plurality of processors, with each of the set of queues having a plurality of chains of dispatch units, each dispatch unit of work being scheduled for execution when queued on one of the plurality of chains according to which component was utilized to execute the dispatch unit of work and a selected queue is one of the set of queues;

said dispatcher software comprising:
A) a set of computer instructions stored in the memory for selecting a first chain from the plurality of chains in the selected queue as a primary chain, wherein:
the selecting of the first chain utilizes an identification of a component in the data processing system that will be utilized to execute a queued dispatch unit of work when dispatched;

B) a set of computer instructions stored in the memory for testing the primary chain in the selected queue for the dispatch unit of work to dispatch;

C) a set of computer instructions stored in the memory for selecting that dispatch unit of work from the primary chain in the selected queue as a next unit of work to dispatch if the primary chain in the selected queue contains the dispatch unit of work to dispatch;

D) a set of computer instructions stored in the memory for selecting a second chain from the plurality of chains in the selected queue as a secondary chain if the next unit of work has not been selected, wherein:
the selecting of the second chain utilizes the identification of the component in the data processing system that will be utilized to execute the queued dispatch unit of work when dispatched;

E) a set of computer instructions stored in the memory for testing the secondary chain in the selected queue for the dispatch unit of work to dispatch if the next unit of work has not been selected;

F) a set of computer instructions stored in the memory for selecting that dispatch unit of work from the secondary chain in the selected queue as the next unit of work to dispatch if the secondary chain in the selected queue contains the unit of work to dispatch; and G) a set of computer instructions stored in the memory for dispatching the next unit of work to dispatch.

14. The dispatcher software in claim 13 which further comprises:

H) a set of computer instructions stored in the memory for selecting another one of the set of queues as the selected queue if the next unit of work has not been selected; and I) a set of computer instructions stored in the memory for repeating sets of computer instructions (A), (B), (C), (D), (E), and (F) if the next unit of work has not been selected.

15. The dispatcher software in claim 13 which further comprises:

H) a set of computer instructions stored in the memory for selecting a third chain from the plurality of chains in the selected queue as a tertiary chain if the next unit of work has not been selected, wherein:
the selecting utilizes the identification of the component in the data processing system that will be utilized to execute the dispatch unit of work when dispatched;

I) a set of computer instructions stored in the memory for testing the tertiary chain in the selected queue for the dispatch unit of work to dispatch if the next unit of work has not been selected; and J) a set of computer instructions stored in the memory for selecting that dispatch unit of work from the tertiary chain in the selected queue as the next unit of work to dispatch if the tertiary chain in the selected queue contains the unit of work to dispatch.

16. The dispatcher software in claim 13 which further comprises:

H) a set of computer instructions stored in the memory for testing a priority chain in the selected queue for the dispatch unit of work to dispatch, wherein:
the priority queue is one of the plurality of chains in the selected queue for initially queuing units of work for execution, and I) a set of computer instructions stored in the memory for selecting that dispatch unit of work from the priority chain in the selected queue as a next unit of work to dispatch if the priority chain in the selected queue contains the dispatch unit of work to dispatch.

17. The dispatcher software in claim 13 wherein:

the component in the data processing system utilized for selecting is a processor module containing a plurality of processors.

18. A dispatch queue storage structure for storing a plurality of dispatch units of work in a memory for access by dispatcher software in an operating system for selecting a next unit of work ready for execution to dispatch, said dispatcher software being executed in a data processing system for determining process execution, the dispatch queue storage structure comprising:

a plurality of queues, wherein each queue of the plurality of queues comprises:
a first chain of dispatch units of work and
a second chain of dispatch units of work; each dispatch unit of work being scheduled for execution when queued on one of the plurality of chains according to which component was utilized to execute the dispatch unit of work wherein:
the data processing system comprises a first set of components and a second set of components;
an execution environment component is a component that is utilized to execute the next unit of work to dispatch; and
for each of the plurality of queues:
the first chain of dispatch units of work is searched for the next queued unit of work to dispatch before the second chain of dispatch units of work when the execution environment component is in the first set of components; and
the second chain of dispatch units of work is searched for the next queued unit of work to dispatch before the first chain of dispatch units of work when the execution environment component is in the second set of components.

19. The dispatch queue storage structure in claim 18, which further comprises:

a priority chain of dispatch units of work; wherein for each of the plurality of queues:
the priority chain of dispatch units of work is searched for the next unit of work to dispatch before the first chain of dispatch units of work and the second chain of dispatch units of work.

20. The dispatch queue storage structure in claim 18, which further comprises:

a third chain of dispatch units of work;
wherein:
the data processing system further comprises a third set of components; and
for each of the plurality of queues:
the first chain of dispatch units of work is searched for the next unit of work to dispatch before the second chain of dispatch units of work and the third chain of dispatch units of work when the execution environment component is in the first set of components; and
the second chain of dispatch units of work is searched for the next unit of work to dispatch before the first chain of dispatch units of work and the third chain of dispatch units of work when the execution environment component is in the second set of components, and the third chain of dispatch units of work is searched for the next unit of work to dispatch before the first chain of dispatch units of work and the second chain of dispatch units of work when the execution environment component is in the third set of components.

* * * * *